June 6, 1939.  J. MARTIN  2,161,520
SAFETY DEVICE FOR AIRPLANES
Filed Dec. 4, 1936  2 Sheets-Sheet 1
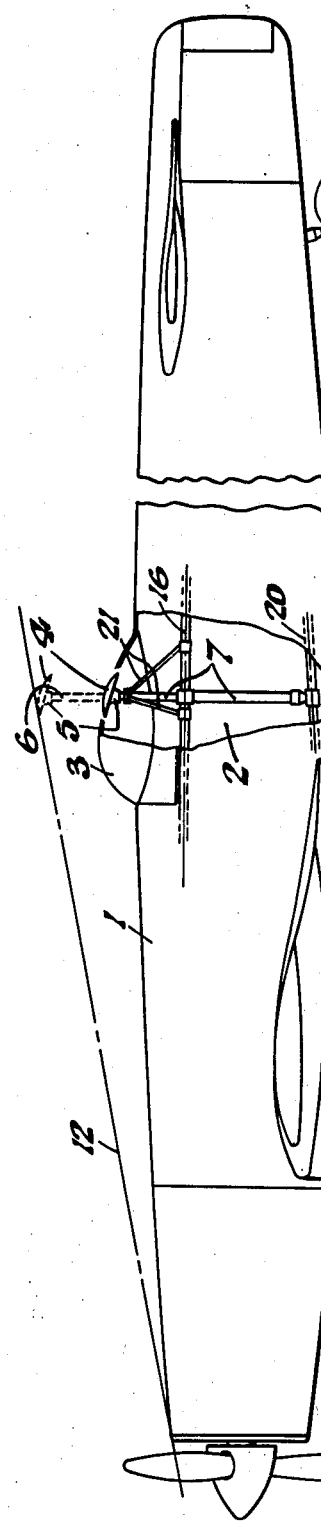
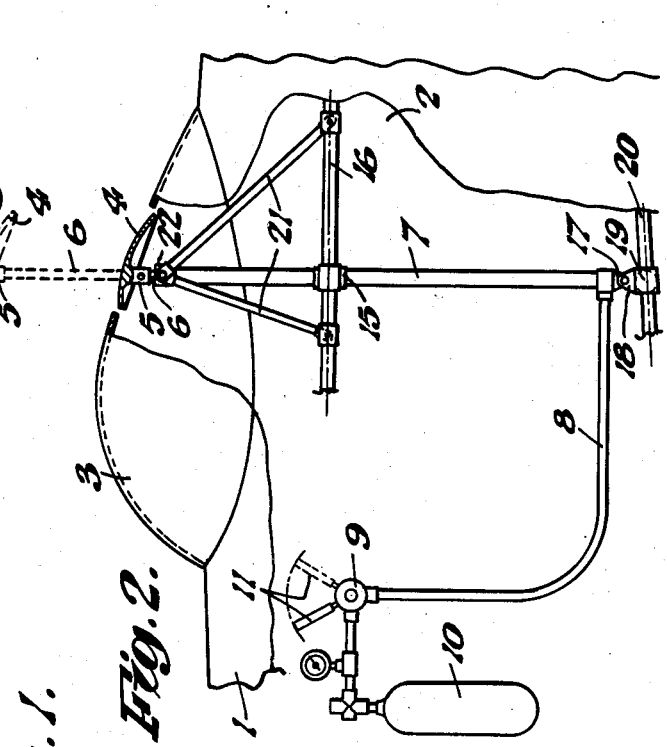
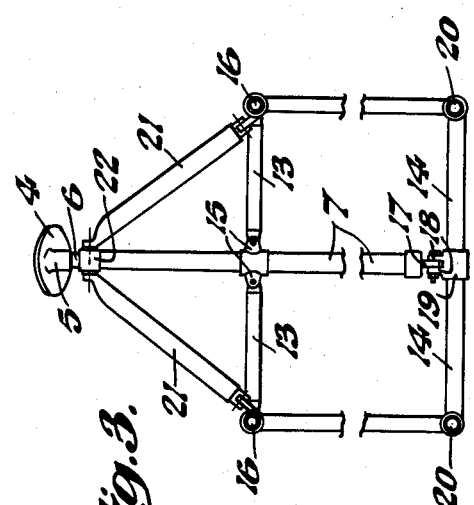
INVENTOR
JAMES MARTIN
PER Rayner &Co
ATTORNEYS June 6, 1939.  J. MARTIN  2,161,520
SAFETY DEVICE FOR AIRPLANES
Filed Dec. 4, 1936  2 Sheets-Sheet 2

INVENTOR
JAMES MARTIN
PER Raymorth
ATTORNEYS

Patented June 6, 1939

2,161,520

UNITED STATES PATENT OFFICE 2,161,520

SAFETY DEVICE FOR AIRPLANES

James Martin, Higher Denham, near Uxbridge, England

Application December 4, 1936, Serial No. 114,159
In Great Britain December 11, 1935

12 Claims. (Cl. 244—100)

This invention comprises a safety device for airplanes and is particularly adapted for use with airplanes of the low wing monoplane type.

The object of the invention is to provide a safety device to protect the pilot and other occupants of the airplane in the event of the machine turning over especially when landing.

When an airplane is occasionally forced to alight on rough ground or in confined space which does not provide sufficient room to enable the machine to be brought to rest before reaching a ditch or other obstruction there is a grave danger of the machine turning over on its back. With airplanes of the low wing monoplane type there is little or no super-structure to protect the pilot or other occupants of the machine who are thus liable to be crushed or trapped beneath the machine. The object of the present invention is to provide a safety device to overcome or mitigate this danger.

According to this invention an emergency supporting or spacing device is provided upon an airplane normally occupying a position close to the fuselage but adapted to be extended to a position where it will function as a support in juxta-position to the cockpit or cabin for preventing contact of the latter with the earth in the event of the airplane turning over on to its back.

In carrying the invention into practice one or more movable members or supports is or are mounted in a convenient position adjacent to the cockpit or cabin of an airplane and means are provided by which such member or members may be raised to a suitable height and retained in position so as to act as supports in the event of the machine turning over on its back.

One embodiment can comprise a ground engaging member with an arcuate outer face normally occupying a position where it is substantially in streamline continuity with the coupé head or cabin bonnet of the fuselage, such ground engaging member being carried by an extensible telescopic device suitably braced within the fuselage, means, e. g. spring or fluid pressure operated, being provided for instantaneously moving the device to the extended position to carry the ground engaging member beyond the coupé head or cabin hood whereby it will function as a skid in the event of the airplane turning on to its back when travelling along the ground, the extended telescopic device serving as a prop to maintain the coupé head or cabin hood clear of the ground.

As an alternative to mounting the safety device upon slidable telescopic supporting members it may be mounted upon hinged links adapted to turn about suitable pivots so as to raise the device to an operative position. Suitable stays and/or locking means may be provided to retain it in position when erected. Any number of suitable safety devices of the type described may be provided at convenient positions on the machine. The safety device may also be arranged to act as a form of jack for raising the machine from the ground in the event of its turning over on its back when the safety device is not in the operative position. The device or devices may then be employed for raising the overturned machine so as to enable the occupants to escape quickly therefrom.

In order that this invention may be clearly understood and readily carried into effect I have appended hereto two sheets of drawings somewhat diagrammatically illustrating embodiments thereof, and wherein:

Fig. 1 is a side elevation view partly in section showing one form of the invention as applied to a low-wing monoplane.

Fig. 2 is a detail sectional side elevation to a larger scale showing the arrangement and mounting of the emergency skid or support in relation to the coupé head or cabin bonnet of an airplane.

Fig. 3 is a detail broken rear elevation view showing the assembly of elements appropriate to the formation of the emergency skid or support.

Figures 4, 5:
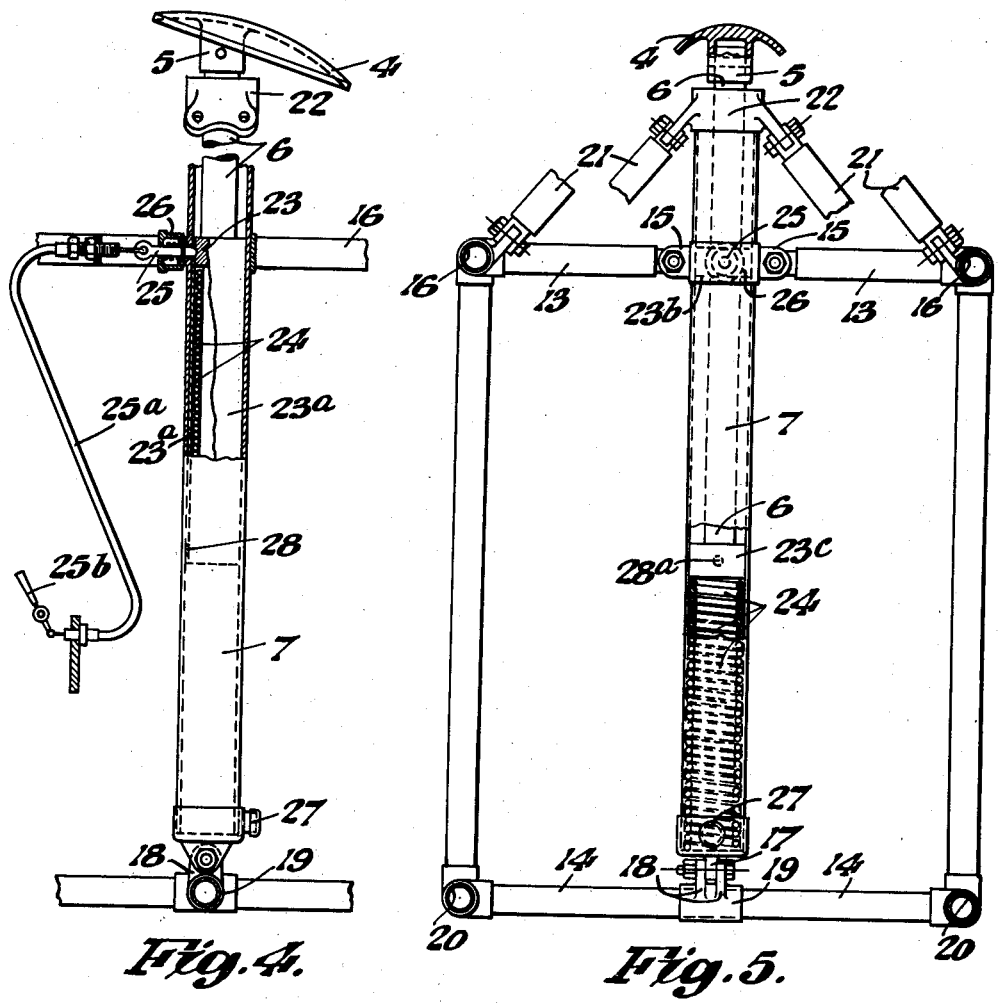
Fig. 4 is a broken detail part sectional side elevation showing a manner of actuating a telescopic emergency skid or support by spring means.
Fig. 5 is a front elevation of Fig. 4.

Referring to the drawings the location of the cockpit or cabin in the fuselage 1 is indicated by the reference numeral 2. The airplane shown is of the high speed mono-plane type and in common with present practice on this type of aircraft the headroom for the pilot is obtained by means of a transparent coupé head or hood 3 having a curvilinear configuration to minimise wind resistance. Such an arrangement affords very little protection for the occupant or occupants of the cockpit or cabin in the event of the airplane turning over on its back during landing or taxying, and also in such event it is at present very difficult and sometimes impossible for such occupants to effect quick egress, and many serious accidents have occurred because of occupants of aircraft being trapped in overturned machines, or being crushed due to the direct impact of the ground with the fuselage. To obviate these disadvantages the present invention contemplates a safety device which will function to protect the cabin and its hood or coupé 3 from direct contact with the ground.

The safety device as shown in Figs. 1, 2 and 3 comprises a ground engaging member 4 preferably in the form of a curved plate forming a shoe having a socket 5 by which it is affixed to the normally upper end of a rod 6 telescoped within a sleeve 7 to provide a pressure fluid operated ram, the pressure fluid being admitted to the lower end of the sleeve 7 from a conduit 8 which is connected via a control valve 9 to the source of pressure fluid supply, such as for example a compressed air cylinder 10. The valve 9 is normally closed and is preferably operated by a radiating handle 11 conveniently accessible by the pilot of the machine, so that the simple action of pulling over the handle 11 admits the pressure fluid to the base of the sleeve 7 and urges upwards the rod 6. The axial dimension of the sleeve 7 and rod 6 are such that when the rod 6 is projected, the shoe 4 occupies a position a sufficient distance beyond the cowl or hood 3 that in the event of the airplane being on its back on the ground there is ample clearance to open the hood 3 to enable the occupant or occupants to effect an escape and to prevent crushing of such occupant or occupants. In Fig. 1 the projected position of the rod 6 and shoe 4 is indicated by the broken lines, and if the line 12 is regarded as the ground plane, in the event of the aircraft being inverted, it will be seen that the shoe 4 also serves as a skid on the ground immediately below the hood 3 so that the latter is protected from direct contact with the ground. The area of the shoe 4 is such as to prevent it from becoming wedged into the ground, and its curvature affords a suitable skidding surface. The normal rear edge of the shoe may, as shown, depend below the front edge, because when an airplane turns over on landing the tail end becomes foremost, and the machine will generally maintain this position as it slides along the ground to a halt, the propeller almost certainly being broken, so that the engine end being the heavier end the machine will come to rest supported on its nose and on the shoe 4, as indicated by the ground plane 12 in Fig. 1.

The sleeve 7 is braced to frame members of the airplane, preferably by upper and lower horizontal tubular rods 13 and 14, the upper rods 13 radiating from suitable lugs or other fastening devices 15, e. g. sockets, at the upper end of the sleeve 7 and being secured in a similar manner, or by welding, to longitudinal frame members 16 of the machine. The lower end of the sleeve 7 can be formed with a depending lug 17 engaged between lugs 18 on a collar 19 through which passes a horizontal member constituting the lower stay 14. This latter may be part of the normal framework of the machine and may, as shown, be connected at its ends to lower longitudinal frame members 20.

The sleeve 7 is braced by a number of stays 21 arranged across a collar 22 and the side frame members 16. The stays 21 are arranged substantially pyramid fashion, the front pair of stays preferably being carried beyond the ram device a lesser distance than the rear, as shown in Fig. 2, to minimise obstruction in the cabin or cockpit.

The shoe 4 preferably normally occupies a position where it will not increase wind resistance and for this purpose the hood 3 can be recessed or apertured in the rear end of its roof to accommodate the shoe 4. Should the hood be recessed, e. g. during moulding if it is made of a cellulose acetate sheet material, it can be formed with an apertured boss to receive the slidable rod 6, thereby minimising draught in the cabin.

Instead of a pressure fluid operated ram, a spring plunger form of device can be provided as shown in Figs. 4 and 5 in which the rod 6 is provided with a piston like enlargement 23 slidable in the sleeve 7 and has a coiled compression spring 24 interposed between it and an abutment in, or the base of, the sleeve 7. A spring loaded detent member 25 is slidably supported in a small housing 26 mounted on the sleeve 7, and this detent normally engages in a recess in the piston like member 23 to act as a bolt restraining outward movement of the rod 6, it being understood that the compression spring 24 is normally held under complete compression, and has a sufficient extension to raise the rod 6 with its shoe 4 to the extent required to serve as a prop and skid to protect the hood 3 when the strength of the spring and the ram like action of the piston member 23 can be relied upon to take the weight of the machine when it is upside down on the ground and the engine end resting on the ground. In this respect a non-return air-inlet valve 27 can be provided in the lower end of the sleeve 7 to admit air as the piston member 23 slides up the sleeve thereby providing a trapped cushion of air within the sleeve. The detent member 25 can be actuated from a remote control device such as a Bowden wire 25a connected to a lever 25b.

The piston like member 23 can carry a depending sleeve 23a encircling the spring 24 to prevent the spring detent member 25 from fouling the spring, and this sleeve 23a can have a recess 28 in its lower end to receive the detent member 25 thus locking the rod 6 in the extended position. As an alternative arrangement (see Fig. 5) a pair of piston like members 23b and 23c can be formed on the rod 6, the upper normally receiving the spring detent member 25, and the lower serving as an abutment for the spring 24 and having a recess 28a to receive the detent member 25 for locking the rod 6 in the extended position. The rod 6 is preferably a steel or light metal tube. If desired the spring detent may be provided with the device shown in Figs. 1, 2, and 3 to serve as a means of locking the rod 6 when in the extended position.

If desired the shoe 4 may be duplicated, either by providing a pair of rams either side of the cabin, or by forming the top of the rod 6 as a T, the ends of the transverse limb carrying the shoes, or any other convenient arrangement.

Figure 6:
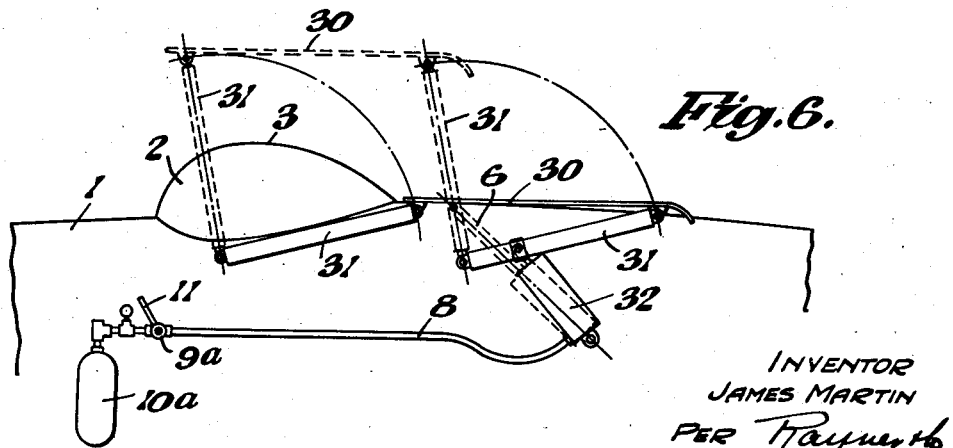
Fig. 6 is a diagrammatic side elevation view showing an alternative method of providing an emergency skid or support.

When it is required to have a greater length of ground engaging surface of the emergency support or skid, it may take the form of a lengthwise bar. In Fig. 6 is shown a suitable method of arranging and mounting such a bar in which a longitudinal bar 30 is adapted to form a skid in the event of the machine turning over when landing or travelling along the ground. This skid bar 30 can be arranged along the longitudinal centre of the machine normally just in rear of the hood 3 and pivoted near its ends to one end of a parallel pair of links 31 pivoted at their other ends to suitable frame members of the fuselage, the said links each being of inverted U form so that they can each be pivoted opposite sides of the hood 3 so as to clear such hood when raised from their normal folded position (close to the fuselage). However, it is preferred to provide two parallel skid bars 30, opposite sides of the hood and to carry them by two pairs of links 31. The links when raised will serve as members to hold the hood 3 clear of the ground, and this raising can be effected by connecting to one of the links the piston rod of a fluid pressure operated ram 32, suitably connected, e. g. as the ram 7 in Fig. 2, via a control valve 9a to a source 10a of supply of pressure fluid.

In all of the devices shown the fluid pressure operated means or the spring operated means for projecting the emergency support can serve as a cushioning means for absorbing shock to minimise risk of fracturing the emergency safety device. However if desired the ground engaging member 4 may itself be fitted with suitable shock absorbing means additional, or alternative, to the beforementioned cushioning medium.

It will be understood that the emergency safety device can be operated as a jacking device in the event of the machine coming to rest on its back before the safety device has been operated. If desired a number of safety devices corresponding to a number of cockpits or cabins in a single airplane may be fitted.

The safety device according to this invention may be readily constructed and applied to almost any type of low wing monoplane. It may be made made light in weight and may be so placed in the fuselage as not to set up any resistance during normal flight. It may however, be quickly brought into an operative position at the will of the pilot and will serve to support the machine on the ground in the event of its turning over on its back thus protecting the occupants and also enabling them to escape quickly from the machine.

I claim:

1. Safety device for protecting cabins or cockpits of airplanes of the low-wing or monoplane type in the event of the airplane turning upside down on the ground, comprising a ground engaging member normally close to the fuselage, means connecting said ground engaging member to the fuselage frame, and operating means for momentarily projecting said ground engaging member outwardly beyond the normally upper side of the fuselage for supporting the normally upper part of the cabin or cockpit clear of the ground to afford a clearance for egress of the occupant when the airplane is upside down on the ground.

2. Safety device for protecting occupants of airplanes in the event of an airplane turning upside down on the ground comprising a ground engaging member normally located in juxtaposition to the cockpit or cabin, and fluid pressure operated means adapted to project the ground engaging member momentarily beyond the normally upper side of the fuselage to provide a rigid strut or support for holding the cabin or cockpit spaced from the ground in the event of the airplane turning on its back so as to afford space between the fuselage and the ground for the egress of the occupant.

3. Safety device for protecting occupants of airplanes in the event of the airplane turning upside down on the ground, comprising a ground engaging member normally located in juxtaposition to the cockpit or cabin, and spring actuated means adapted to project the ground engaging member beyond the normally upper side of the fuselage to provide a rigid strut or support for holding the cabin or cockpit spaced from the ground to afford clearance between the airplane and the ground for the egress of the occupant when the airplane is upside down on the ground.

4. In an airplane of the low-wing or monoplane type a safety device to protect the cabin or cockpit if the airplane overturns on the ground, comprising a grounding engaging member mounted in juxtaposition to the cabin or cockpit, a collapsible strut device connecting said ground engaging member to the fuselage frame, and means to project said strut device and ground engaging member from the upper side of the fuselage to provide a rigid support for the cabin or cockpit part of the fuselage to afford space for the egress of the occupants when the airplane is upside down on the ground.

5. In an airplane of the low-wing or monoplane type a safety device to protect the cabin or cockpit if the airplane overturns on the ground comprising a longitudinal bar like skid member located close to the fuselage, a collapsible strut device connecting it to the fuselage, and means extending said strut device so that it projects beyond the top of the fuselage to bring said skid member to a position substantially spaced from the fuselage whereby it acts as a skid spaced from the fuselage in the event of the airplane turning on to its back when on the ground, said strut device serving as a means to hold the fuselage spaced from the ground to afford egress for the occupant when the airplane is upside down on the ground.

6. In an airplane of the low-wing or monoplane type a safety device to protect the cabin or cockpit if the airplane overturns, comprising a pair of ground engaging members on the upper side of the fuselage at opposite sides of the cockpit or cabin, means for supporting said ground engaging members rigidly in spaced relationship from the fuselage to hold the fuselage clear of the ground when upside down to afford egress space for the occupant and means for folding them close to the fuselage.

7. In an airplane of the low-wing or monoplane type, a safety device to protect the cabin or cockpit if the airplane overturns on the ground, comprising a pair of ground engaging members on the upper side of the fuselage at opposite sides of the cockpit or cabin, means for supporting said ground engaging members rigidly in spaced relationship from the fuselage to hold the cabin or cockpit clear of the ground when upside down to afford egress space for the occupant, and means for folding them close to the fuselage, said means comprising a pair of telescopic extensible strut like members carried by the fuselage.

8. In an airplane of the low-wing or monoplane type, a safety device to protect the cabin or cockpit if the airplane overturns on the ground, comprising a pair of ground engaging members on the upper side of the fuselage at opposite sides of the cockpit or cabin, means for supporting said ground engaging members rigidly in spaced relationship from the fuselage to hold the cabin or cockpit clear of the ground when upside down to afford egress space for the occupant, and means for folding them close to the fuselage, said means comprising a pair of normally folded parallel link devices opposite sides of the cockpit or cabin with means for opening them to extended positions.

9. In an airplane of the low-wing or monoplane type, a safety device to protect the cabin or cockpit if the airplane overturns on the ground, comprising a ground engaging member having a substantially arcuate ground engaging face and normally located close against or flush with the top of a cabin or cockpit hood or coupe, a telescopic device connecting said member to the fuselage frame, and means to extend said telescopic device to carry the ground engaging member beyond the top of said hood or coupe to hold the hood or coupe spaced from the ground to afford egress space for the occupant.

10. Safety device for protecting occupants of airplanes when the airplane turns upside down on the ground, comprising a ground engaging member normally located in juxtaposition to the cockpit or cabin, means adapted to project the ground engaging member beyond the normally upper side of the fuselage to provide a rigid strut or support for holding the cabin or cockpit spaced from the ground in the event of the airplane turning on to its back to afford egress space for the occupant, and locking means automatically locking the strut or support in the supporting position.

11. In an airplane, a fuselage having a crash protector comprising a member movable vertically to project above the top of the fuselage and capable of supporting the weight of the airplane when the airplane inverts and rests upon said member.

12. In an airplane, a fuselage, a canopy and means projectible above the canopy to support the weight and impact of the fuselage when it inverts against a landing area, said means including a shock absorber.

JAMES MARTIN.